United States Patent
Wyatt et al.

(10) Patent No.: US 9,527,601 B2
(45) Date of Patent: Dec. 27, 2016

(54) METHOD AND APPARATUS FOR GENERATING A VIRTUAL INNER MARKER FOR AN AIRCRAFT LANDING APPROACH

(71) Applicant: HONEYWELL INTERNATIONAL INC., Morristown, NJ (US)

(72) Inventors: Ivan Sandy Wyatt, Scottsdale, AZ (US); Gang He, Morristown, NJ (US); Thea L. Feyereisen, Hudson, WI (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 280 days.

(21) Appl. No.: 13/759,408

(22) Filed: Feb. 5, 2013

(65) Prior Publication Data

US 2014/0222257 A1   Aug. 7, 2014

(51) Int. Cl.
*B64D 45/08*   (2006.01)
*G08G 5/02*    (2006.01)
*G08G 5/00*    (2006.01)

(52) U.S. Cl.
CPC ............ *B64D 45/08* (2013.01); *G08G 5/0021* (2013.01); *G08G 5/02* (2013.01); *G08G 5/025* (2013.01)

(58) Field of Classification Search
CPC ....... B64D 45/04; B64D 45/08; G08G 5/0021; G08G 5/006; G08G 5/02; G08G 5/025; G01S 13/913; G01S 1/022; G01S 1/18; G01C 5/005; G01C 5/06; G05D 1/0653; G05D 1/0676
USPC ..................................... 701/16–18
See application file for complete search history.

(56) References Cited

U.S. PATENT DOCUMENTS

| | | | |
|---|---|---|---|
| 6,405,107 B1 * | 6/2002 | Derman | 701/3 |
| 6,600,977 B2 | 7/2003 | Johnson et al. | |
| 7,286,911 B2 | 10/2007 | Kane | |
| 7,463,954 B1 | 12/2008 | He | |
| 7,671,761 B2 | 3/2010 | Lapp | |
| 7,852,236 B2 * | 12/2010 | Feyereisen et al. | 701/16 |
| 8,073,578 B1 * | 12/2011 | McCusker | 701/3 |
| 8,195,347 B2 | 6/2012 | Boorman | |
| 8,234,058 B1 | 7/2012 | Barber et al. | |
| 8,275,495 B2 | 9/2012 | Joyeux et al. | |
| 8,332,083 B1 * | 12/2012 | McCusker | 701/4 |
| 8,498,758 B1 * | 7/2013 | Bell et al. | 701/4 |
| 8,532,849 B1 * | 9/2013 | Tsai | G01C 23/00 340/979 |

(Continued)

FOREIGN PATENT DOCUMENTS

| | | |
|---|---|---|
| EP | 2261878 A1 | 12/2010 |
| EP | 2717229 A1 | 4/2014 |

OTHER PUBLICATIONS

Ed McKenna, "Synthetic Vision Systems," Avionics Magazine, May 1, 2012.

(Continued)

*Primary Examiner* — Helal A Algahaim
*Assistant Examiner* — Donald J Wallace
(74) *Attorney, Agent, or Firm* — Lorenz & Kopf, LLP (57) ABSTRACT

A system and method is provided for anticipating a missed approach point (MAP) during an instrument landing of an aircraft. Symbology is generated and displayed that graphically represents a lateral distance between a runway threshold and a virtual inner marker. The MAP is identified as the location of the aircraft when the symbology reaches a displayed runway threshold.

15 Claims, 7 Drawing Sheets

(56) References Cited

U.S. PATENT DOCUMENTS

| | | | |
|---|---|---|---|
| 8,615,337 B1* | 12/2013 | McCusker et al. | 701/14 |
| 8,718,915 B1* | 5/2014 | Turcios | G01C 23/005 |
| | | | 342/176 |
| 9,245,450 B1* | 1/2016 | Chiew | G05D 1/0676 |
| 2003/0200024 A1* | 10/2003 | Poreda | G08G 5/0026 |
| | | | 701/120 |
| 2004/0044446 A1* | 3/2004 | Staggs | 701/16 |
| 2006/0195235 A1* | 8/2006 | Ishihara et al. | 701/16 |
| 2008/0140272 A1 | 6/2008 | Zadrozynski et al. | |
| 2010/0023189 A1* | 1/2010 | Suddreth et al. | 701/16 |
| 2010/0036551 A1 | 2/2010 | Lacaze et al. | |
| 2010/0131126 A1* | 5/2010 | He et al. | 701/14 |
| 2010/0305786 A1* | 12/2010 | Boorman | 701/16 |
| 2011/0035080 A1 | 2/2011 | Murphy | |
| 2011/0106345 A1 | 5/2011 | Takacs et al. | |
| 2011/0246003 A1 | 10/2011 | Lafon et al. | |
| 2012/0265376 A1 | 10/2012 | Fleiger-Holmes et al. | |
| 2014/0097973 A1* | 4/2014 | Baudson et al. | 340/972 |

OTHER PUBLICATIONS

EP Search Report for Application No. EP 14154646.8 dated Jul. 11, 2014.

EP Examination Report for Application No. EP 14154646.8 dated Jul. 29, 2014.

Kramer, L.J. et al.; Commercial Flight Crew Decision Making During Low-Visibility Approach Operations Using Fused Synthetic and Enhanced Vision Systems, The International Journal of Aviation Psychology, 19(2), 131-157; Taylor & Francis Group.

* cited by examiner

METHOD AND APPARATUS FOR GENERATING A VIRTUAL INNER MARKER FOR AN AIRCRAFT LANDING APPROACH

TECHNICAL FIELD

Embodiments disclosed herein relate generally to avionics display systems, and more particularly, to a system and method for generating and displaying a virtual, inner marker on an aircraft landing approach.

BACKGROUND

It is now common for a commercial aircraft to be equipped with a flight guidance and management system (FGMS), which includes a flight management system (FMS) and a flight guidance system (FGS) having an autopilot functionality. The combination FMS/FGS of a modern FGMS is often capable of operating in a precision approach mode, such as an "instrument landing system" or "ILS" mode. In this case, a localizer provides azimuth, or lateral information to guide an aircraft to the centerline of a runway and is located at the far end of the runway. Aircraft guidance is provided by ILS receivers on the aircraft performing a modulation depth comparison of a 90 Hz and a 150 Hz signal. A predominance of either signal indicates that the aircraft is off the runway centerline.

Vertical guidance, in particular, may be provided by a glideslope (G/S) antenna array, which is located near the runway touchdown zone and which broadcasts a G/S signal over a selected channel. Certain antennae in the array modulate a first component of the G/S at a first frequency (e.g., 90 hertz), while other antennae in the array modulate a second component of the G/S signal at a second frequency (e.g., 150 hertz). Collectively, the components of the G/S signal define a G/S beam, which originates from an anchor point at the runway's threshold and projects through the final approach fix. When in range of the G/S antenna array, the G/S signal is received by, for example, a multi-mode receiver deployed onboard the aircraft. The G/S signal permits the FGS autopilot to determine the location of the G/S beam and the aircraft's position relative thereto. The aircraft, whether controlled directly by the FGS autopilot or by the pilot utilizing visual cues provided on the primary flight display (PFD), can then be guided vertically along the G/S beam to ensure a safe and accurate landing. A standard G/S is three degrees down tail to the approach end of the runway.

Once established on an approach, a pilot may follow an ILS and descend along an approach path indicated by the localizer and vertical or glideslope (G/S) to the decision height (DH) at which the pilot must have adequate visual reference to the centerline of a runway. A standard glideslope (G/S) is three degrees (3°) downhill to the approach-end of the runway.

In addition to the localizer and glideslope signals, an ILS may include range information in the form of outer marker, middle marker, and inner marker beacons that provide visual and audible annunciations to the pilot. The outer marker typically indicates where an aircraft intercepts the glide path at the published altitude. The middle marker announces that the decision height (DH) point (e.g. 3500 feet from the runway threshold) has been reached. The DH is a specific height at which a missed approach must be initiated if a required visual reference to continue the approach has not been established. The inner marker indicates the imminent arrival at the runway threshold. Distance measuring equipment has been utilized to replace or augment markers and provides accurate and continuous monitoring of landing environment (i.e. approach, runway lighting, etc.) in order to continue the descent to a landing. Absent the required visual reference, the pilot must carry out a missed approach procedure.

Finally, airports may be equipped with medium or high intensity approach lighting system. Viewing the approach lighting system at the DH allows a pilot to continue descending toward the runway, even if the runway or runway lights cannot be seen.

There are currently five categories of ILS which support similarly named categories of operation; i.e. CAT I, CAT II, CAT IIIA, CAT IIIB, and CAT IIIC, that are, in part, characterized by DH minimums; i.e. 200 feet, 100 feet, 100 feet, 50 feet, and zero feet, respectively. The missed approach corresponds to the intersection of the aircraft's geometric GS and the published minimum altitude. Referring particularly to CAT I approaches, operations that are based on barometrically determined minimum altitude are subject to errors of plus or minus 75 feet since minimum altitudes of CAT I are 200 feet or greater above the runway threshold, an error of plus or minus 75 feet is considered tolerable because the pilot enters the visual segment well above the terrain even when the altimeter error is minus 75 feet.

Below standard CAT I operation, minima are based on radio altitude, which is not subject to the above referred large barometric altimetry errors. However, to publish approaches with minima based on radio altitude, the terrain beneath the approach path must be precisely surveyed and flight checked. Sometimes, the use of a radio altimeter is not practical due to irregular terrain beneath the approach path. If a procedure generates a RANA (Radio Altitude Not Authorized), an inner marker may be utilized to identify the decision point (DP); however, many airports may not be equipped with inner markers.

In view of the foregoing, it would be desirable to provide a system and method for facilitating the use of a barometric Decision Altitude (DA) for landing approaches having geometric glide path and minimums below that specified for CAT I landing approaches. This will enable lower than standard CAT I approaches to be published with Decision Altitude minimums, alleviating the need for radio altitude surveys thus making more airports available with new airport approaches published with lower altitude minima.

It should be understood that while the above described background primarily relates to an Instrument Landing System, the principles and improvements describe hereinafter are also applicable to a Global Positioning Landing System (GLS), a Wide Area Augmentation System Localizer Performance with Vertical Guidance (WAAS-LPV), or the like.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In accordance with an embodiment, there is provided a method for anticipating a missed approach point (MAP) during an instrument landing of an aircraft. The method comprises a first step of displaying symbology graphically representative of a lateral distance between a runway threshold and a virtual inner marker.

In accordance with a further embodiment there is provided a flight display system deployed on a host aircraft, for anticipating a missed approach point (MAP) during an instrument landing on an airport runway. The system comprises an onboard display device, and a processor operatively coupled to the display device and configured to (1) retrieve aircraft flight data, (2) retrieve airport data, (3) process the flight data and airport data to determine the location of the MAP; and (4) display symbology graphically representative of the MAP.

In accordance with a still further embodiment there is provided a method for anticipating a missed approach point (MAP) during an aircraft instrument landing at an airport having a runway. The method comprises retrieving aircraft flight data and airport data, and processing the flight data and airport data to determine a lateral distance between the runway threshold and a virtual inner marker. Symbology graphically representative of the runway threshold and the distance thereto is displayed, and the MAP is identified as the location of the aircraft when the symbology reaches the displayed runway threshold.

DETAILED DESCRIPTION

The following detailed description is merely exemplary in nature and is not intended to limit the subject matter of the application and uses thereof. Furthermore, there is no intention to be bound by any theory presented in the preceding background or the following detailed description. Presented herein for purposes of explication is a certain exemplary embodiment of how a flight course (e.g. approach or departure course) may be graphically generated. For example, a graphical generation of an approach course will be discussed. However, it should be appreciated that this explicated example embodiment is merely an example and a guide for implementing the novel display system and method for graphically creating an approach/departure course. As such, the examples presented herein are intended as non-limiting.

Techniques and technologies may be described herein in terms of functional and/or logical block components and with reference to symbolic representations of operations, processing tasks, and functions that may be performed by various computing components or devices. It should be appreciated that any number of hardware, software, and/or firmware components configured to perform the specified functions may realize the various block components shown in the figures. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to aircraft display systems adapted for graphically selecting the flight course. A user can visualize the approach course, allowing for a quick and proper selection of the flight course. The overall workload on the user is reduced and the graphical adjustment is implemented in a manner that improves situational awareness. In addition, an embodiment may allow for fuel conservation, reducing required time, and earlier error detection in selecting the flight course.

Figure 1:
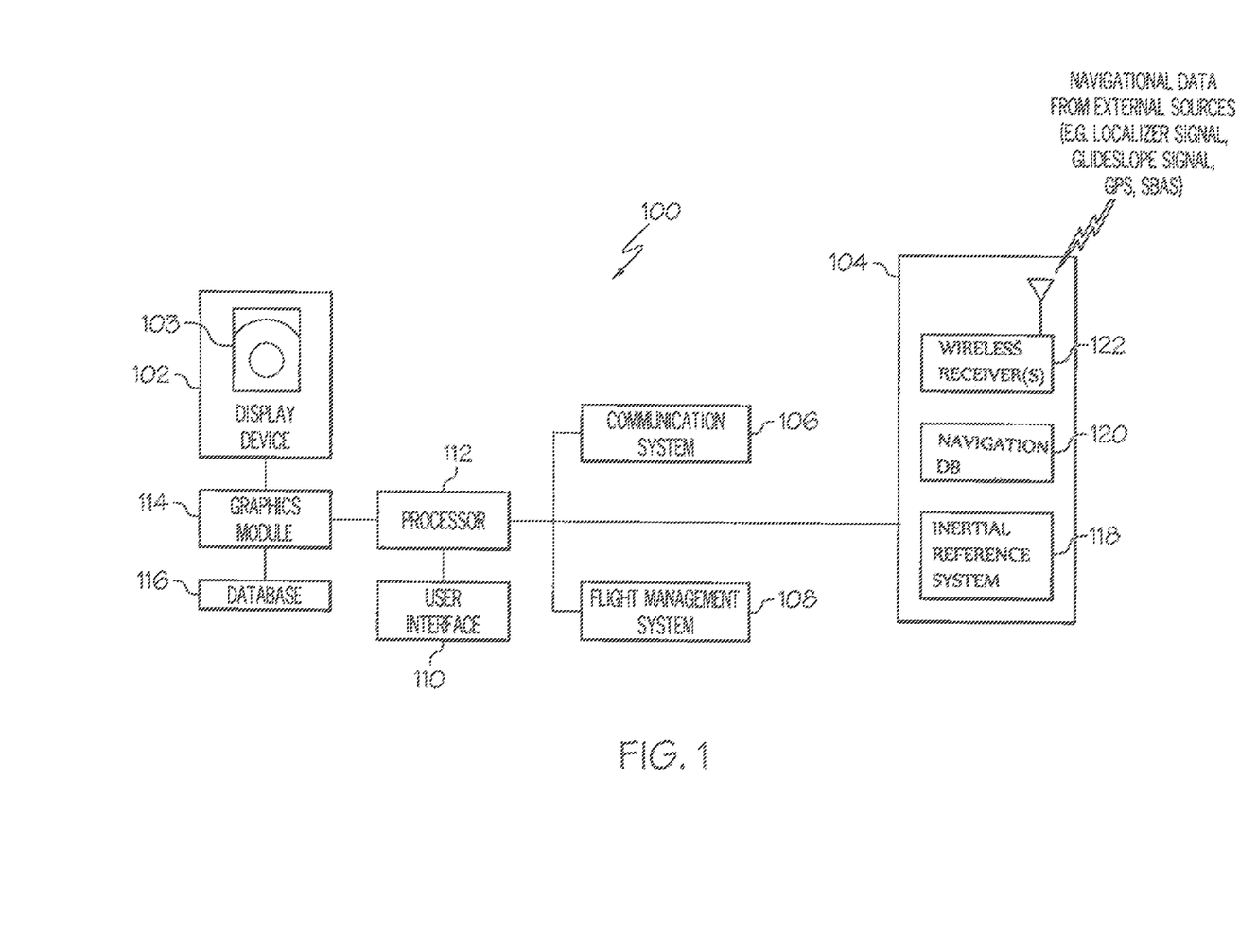
FIG. 1 is a block diagram of an exemplary embodiment of an aircraft display system.

FIG. 1 depicts an exemplary embodiment of an aircraft display system 100. In an exemplary embodiment, the display system 100 includes, without limitation, a display device 102 for displaying a graphical flight plan image 103 (e.g. on an multi-function display (MFD), the egocentric display on an SVS display, etc.), a navigation system 104, a communications system 106, a flight management system (FMS) 108, a processor 112, a graphics module 114, a user interface 110, and a database 116 suitably configured to support operation of the graphics module 114 and display device 102, as described in greater detail below. Navigation system 104 may include an inertial reference system 118, a navigation database 120 and one or more wireless receivers 122 for receiving navigational data from external sources such as a locator signal, a glideslope signal, and GPS or SBAS signals in a well-known manner.

It should be understood that FIG. 1 is a simplified representation of a display system 100 for purposes of explanation and ease of description and is not intended to limit the application or scope of the subject matter in any way. In practice, the display system 100 and/or the aircraft will include numerous other devices and components for providing additional functions and features, as will be appreciated in the art. For example, the display system 100 and/or the aircraft may include one or more avionics systems (e.g., a weather system, an air traffic management system, a radar system, a traffic avoidance system) coupled to the flight management system 108 and/or the processor 112 for obtaining and/or providing real-time flight-related information that may be displayed on the display device 102.

In an exemplary embodiment, the display device 102 is coupled to the graphics module 114. The graphics module 114 is coupled to the processing architecture 112, and the processing architecture 112 and the graphics module 114 are cooperatively configured to display, render, or otherwise convey one or more graphical representations or images of the approach course on the display device 102. As stated previously, navigational system 104 includes an inertial reference system 118, a navigation database 120, and at least one wireless receiver 122. Inertial reference system 118 and wireless receiver 122 provide processor 112 with navigational information derived from sources onboard and external to the host aircraft, respectively. More specifically, inertial reference system 118 provides processor 112 with information describing various flight parameters of the host aircraft (e.g., position, orientation, velocity, etc.) as monitored by a number of motion sensors (e.g., accelerometers, gyroscopes, etc.) deployed onboard the aircraft. By comparison, and as indicated in FIG. 1, wireless receiver 122 receives navigational information from various sources external to the aircraft. These sources may include various types of navigational aids (e.g., global position systems, non-directional radio beacons, very high frequency Omnidirectional radio range devices (VORs), etc.), ground-based navigational facilities (e.g., Air Traffic Control Centers, Terminal Radar Approach Control Facilities, Flight Service Stations, and control towers), and ground-based guidance systems (e.g., instrument landing systems). In certain instances, wireless receiver 122 may also periodically receive Automatic Dependent Surveillance-Broadcast (ADS-B) data from neighboring aircraft. In a specific implementation, wireless receiver 122 assumes the form of a multi-mode receiver (MMR) having global navigational satellite system capabilities.

Navigation database 120 stores information required to construct flight plans and approach courses. For example, the navigation database 120 may contain information pertaining to the geographical location of reference points (e.g. waypoints) and line segments that connect the waypoints (e.g., legs) for various terminal area procedures. Such procedures may include runways, approaches, approach transitions, standard terminal arrival route (STAR), and STAR transitions, each to be discussed in detail below. The runway procedure will define the runways for an airport, while the approach procedure will define the flight path that should be followed for the selected runway. For example, Los Angeles International Airport (LAX) has multiple runways and various approaches for each runway. The approach transition procedure will further define the proper position of the aircraft for the selected approach and runway. The STAR and STAR transition procedure will further define the required flight course for the selected approach.

Processor 112 is coupled to the navigation system 104 for obtaining real-time navigational data and/or information regarding operation of the aircraft to support operation of the display system 100. In an exemplary embodiment, the communications system 106 is coupled to the processor 112 and configured to support communications to and/or from the aircraft, as is appreciated in the art. The processor 112 is also coupled to the flight management system 108, which in turn, may also be coupled to the navigation system 104 and the communications system 106 for providing real-time data and/or information regarding operation of the aircraft to the processor 112 to support operation of the aircraft. In an exemplary embodiment, the user interface 110 is coupled to the processor 112, and the user interface 110 and the processor 112 are cooperatively configured to allow a user to interact with display device 102 and other elements of display system 100, as described in greater detail below.

In an exemplary embodiment, the display device 102 is realized as an electronic display configured to graphically display flight information or other data associated with operation of the aircraft under control of the graphics module 114. In an exemplary embodiment, the display device 102 is located within a cockpit of the aircraft. It will be appreciated that although FIG. 1 shows a single display device 102, in practice, additional display devices may be present onboard the aircraft. In an exemplary embodiment, the user interface 110 is also located within the cockpit of the aircraft and adapted to allow a user (e.g., pilot, co-pilot, or crew member) to interact with the remainder of display system 100 and enables a user to select content displayed on the display device 102, as described in greater detail below. In various embodiments, the user interface 110 may be realized as a keypad, touchpad, keyboard, mouse, touchscreen, joystick, knob, microphone, or another suitable device adapted to receive input from a user. In preferred embodiments, user interface 110 may be a touchscreen, cursor control device, joystick, or the like.

In an exemplary embodiment, the navigation system 104 is configured to obtain one or more navigational parameters associated with operation of the aircraft. The navigation system 104 may be realized as a global positioning system (GPS), a satellite-based augmentation system (SBAS), inertial reference system (IRS), or a radio-based navigation system (e.g., VHF Omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the instantaneous position of the aircraft, that is, the current location of the aircraft (e.g., the latitude and longitude) and the altitude or above ground level for the aircraft. The navigation system 104 may also obtain and/or determine the heading of the aircraft (i.e., the direction the aircraft is traveling in relative to some reference).

In an exemplary embodiment, the communications system 106 is suitably configured to support communications between the aircraft and another aircraft or ground location (e.g., air traffic control). In this regard, the communications system 106 may be realized using a radio communication system or another suitable data link system. In an exemplary embodiment, the flight management system 108 (or, alternatively, a flight management computer) is located onboard the aircraft. Although FIG. 1 is a simplified representation of display system 100, in practice, the flight management system 108 may be coupled to one or more additional modules or components as necessary to support navigation, flight planning, and other aircraft control functions in a conventional manner.

The processor 112 and/or graphics module 114 are configured in an exemplary embodiment to display and/or render information pertaining to the flight plan on the display device 102 to allow a user (e.g., via user interface 110) to review various aspects (e.g., estimated flight time, rates of ascent/descent, flight levels and/or altitudes, and the like) of the flight plan. The processor 112 generally represents the hardware, software, and/or firmware components configured to facilitate the display and/or rendering of a navigational map on the display device 102 and perform additional tasks and/or functions described in greater detail below. Depending on the embodiment, the processor 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The processor 112 may also be implemented as a combination of computing devices, e.g., a combination of a digital signal processor and a microprocessor, a plurality of microprocessors, one or more microprocessors in conjunction with a digital signal processor core, or any other such configuration. In practice, the processor 112 includes processing logic that may be configured to carry out the functions, techniques, and processing tasks associated with the operation of the display system 100, as described in greater detail below. Furthermore, the steps of a method or algorithm described in connection with the embodiments disclosed herein may be embodied directly in hardware, in firmware, in a software module executed by the processor 112, or in any practical combination thereof.

The graphics module 114 generally represents the hardware, software, and/or firmware components configured to control the display and/or rendering of a navigational map on the display device 102 and perform additional tasks and/or functions described in greater detail below. In an exemplary embodiment, the graphics module 114 accesses one or more databases 116 suitably configured to support operations of the graphics module 114, as described below. In this regard, the database 116 may comprise an approach course database, terrain database, a weather database, a flight plan database, an obstacle database, a navigational database, a geopolitical database, a terminal airspace database, a special use airspace database, or other information for rendering and/or displaying content on the display device 102, as described below. It will be appreciated that although FIG. 1 shows a single database 116 for purposes of explanation and ease of description, in practice, numerous databases will likely be present in a practical embodiment of the display system 100.

Figure 2:
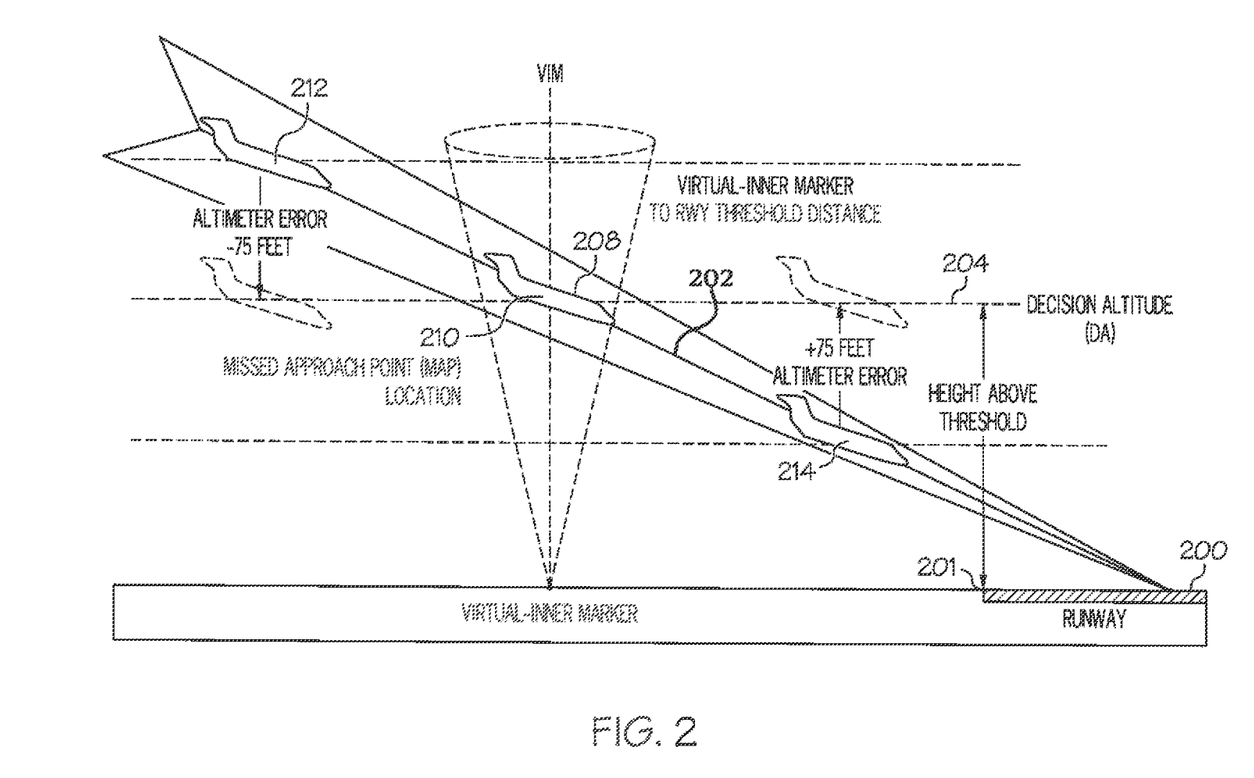
FIG. 2 is a graphical representation of a runway having a threshold and a missed approach point to illustrate the effects of barometric error on the location of the MAP.

FIG. 2 is a graphical representation of a runway 200 having a threshold 201 and a missed approach point (MAP) 210, (i.e. the intersection of the geometric glide path 202 and the minimum altitude above the runway threshold (DA(H))) 204). This is also known as the decision altitude (DA).

As stated previously, barometric errors can affect the location along the glide path where an aircraft 208 reaches the decision altitude (the MAP). For example, if there is no altimeter error, the aircraft's indicated altitude and actual altitude are the same, and the aircraft reaches the decision altitude at the MAP. This is shown at 208. An error of minus 75 feet means that the aircraft is indicating an altitude 75 feet lower than actual. The result is that the aircraft reaches the decision altitude higher above the ground, further from the runway, and before the MAP. This is shown at location 212. An altimeter of plus 75 feet means that the aircraft is indicating 75 feet higher than actual. The result is that the aircraft reaches the decision altitude lower to the ground, closer to the runway, and past the MAP location. This is shown at location 214.

The Virtual Inner Marker system (VIM), in accordance with embodiments described therein locates the lateral position of the MAP on an approach with a geometric glide path (Instrument Landing System, Localizer Performance with Vertical Guidance, etc.). The system alerts the crew when the aircraft nears and passes the lateral position of the MAP and the pilot selected decision altitude (DA). In addition, the VIM is consistent and integrated with standard cockpit techniques used to alert the crew when approaching minimums (decision altitude/decision height—DA/DH), the DA using barometric altitude and the DH using radio altitude.

The inner marker uniquely identifies the location of the MAP. The virtual inner marker (VIM) utilizes the geometry of the approach to create a virtual inner marker point along the approach course and then uses this position to provide minimums alerting. The system may be used in conjunction with all precision approaches having barometric altitude minima i.e. decision altitudes (DA) thus facilitating the use of a barometric DA for approaches with a geometric glide path and minimums below a standard Category I approach (i.e. an approach with a decision minima altitude below 200 feet), HATh (Height Above Threshold), and a visibility requirement below 1800/2400 RVR (runway visible range). Thus, the system and method described herein permit lower than Category I approaches to be published with decision altitude minimums alleviating the requirement for radio altitude surveys or installation of VHF inner marker radio beacons. New approaches may be published with lower altitude minima; i.e. lower altitude minima may be based on the DA because the MAP is accurately located using the VIM.

Figure 3:
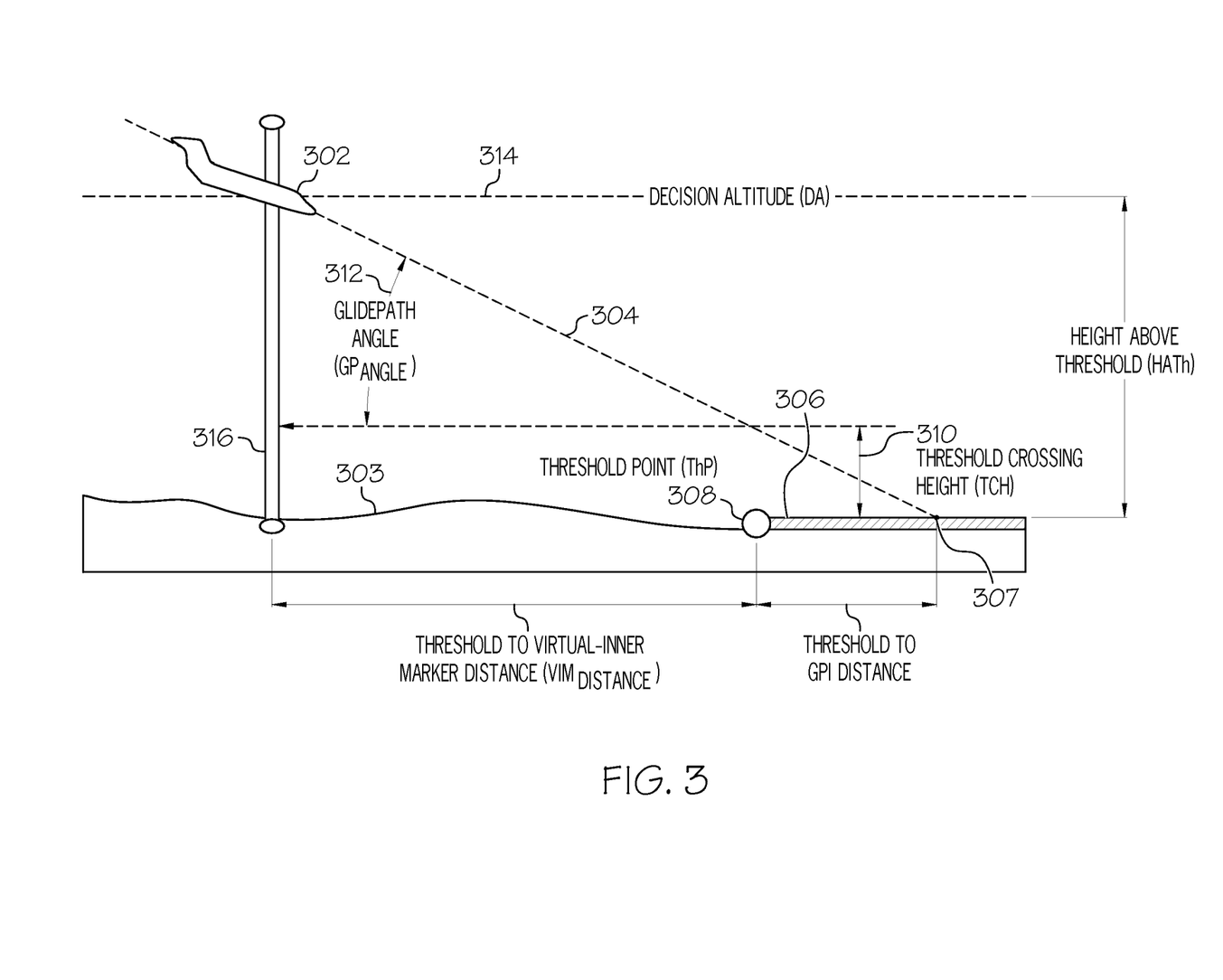
FIGS. 3 and 4 are graphical representations of an aircraft on an approach to a landing.
Figure 4:
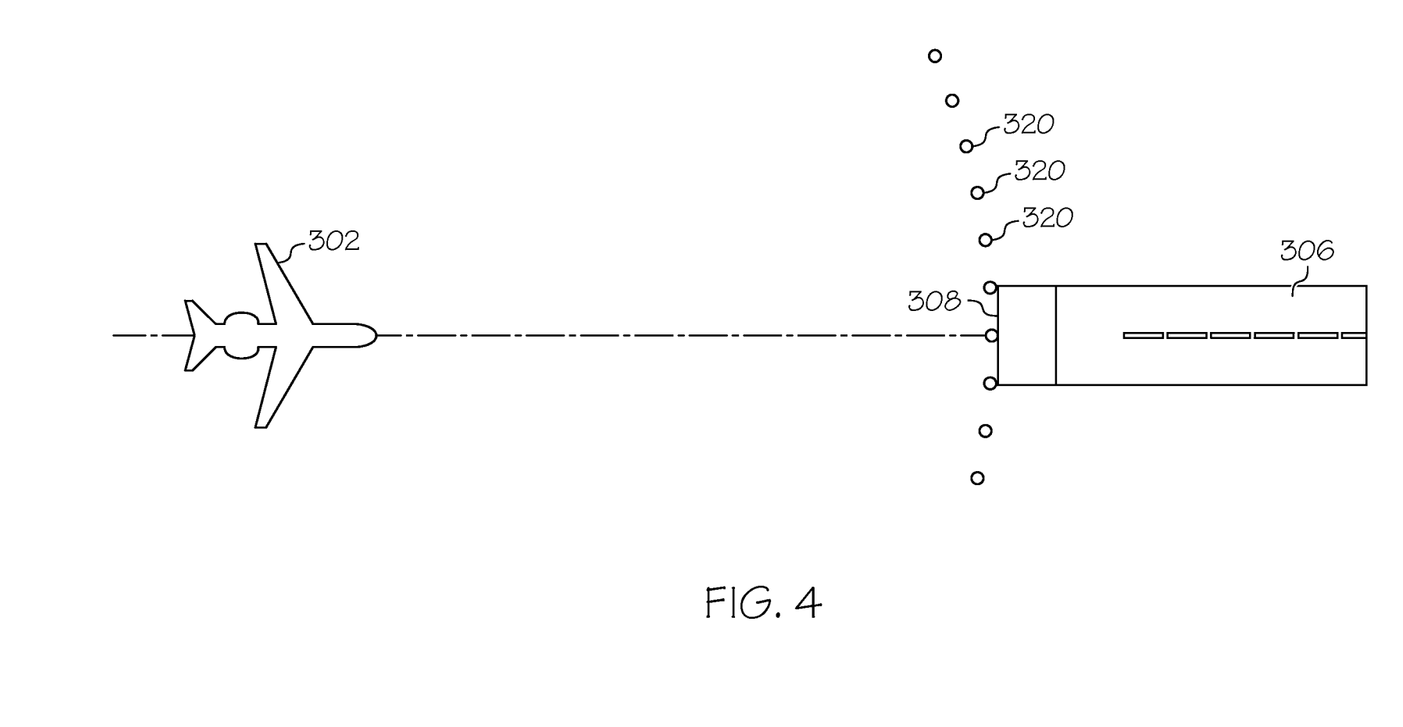

FIGS. 3 and 4 are graphical representations of an aircraft 302 on an approach 304 over terrain 303 to a landing on runway 306 in accordance with an embodiment. The approach is defined by the runway threshold point's (ThP) 308 latitude, longitude, and elevation, the threshold crossing height (TCH) 310, the glide path angle (GPAngle) 312, and the decision altitude (DA) 314.

The location of the virtual inner marker is created from databases in the navigation data base 120 (FIG. 1) and pilot input (which may vary from pilot-to-pilot). Thus, it should be appreciated that barometric altimeter errors have no impact and the lateral position of the virtual inner marker 316 is known without ambiguity.

In accordance with the above, the threshold to the virtual inner marker distance (VIMDistance) is determined by:

$$VIM_{Distance} = \frac{DA - ThP_{Elevation} - TCH}{\operatorname{Tan}(GP_{Angle})}$$

where: DA is the Decision Altitude;

$ThP_{Elevation}$ is the latitude, longitude, and elevation of the runway Threshold Point;

TCH is the runway Threshold Crossing Height, and $GP_{Angle}$ is the glide path angle.

To anticipate the aircraft approaching the vertical inner marker, symbology is generated by processor 112, database 116, and graphics module 114 (FIG. 1) and displayed on display device 102 which that graphically represents the distance between the runway threshold 308 and the virtual inner marker 316. This may take the form of a Minimum Range Ring (MRR) 320, a perspective graphic along the approach path of a predetermined size and area, or the like. For example, referring to FIG. 4, as aircraft 302 progresses along the approach path, the MRR 320 is shown on the display device 102 and moves towards the runway as aircraft 302 progresses. When the MRR 320 reaches the runway threshold (shown in FIG. 4), the aircraft is at the missed approach point (MAP) and minimums annunciation is triggered.

Figure 5:
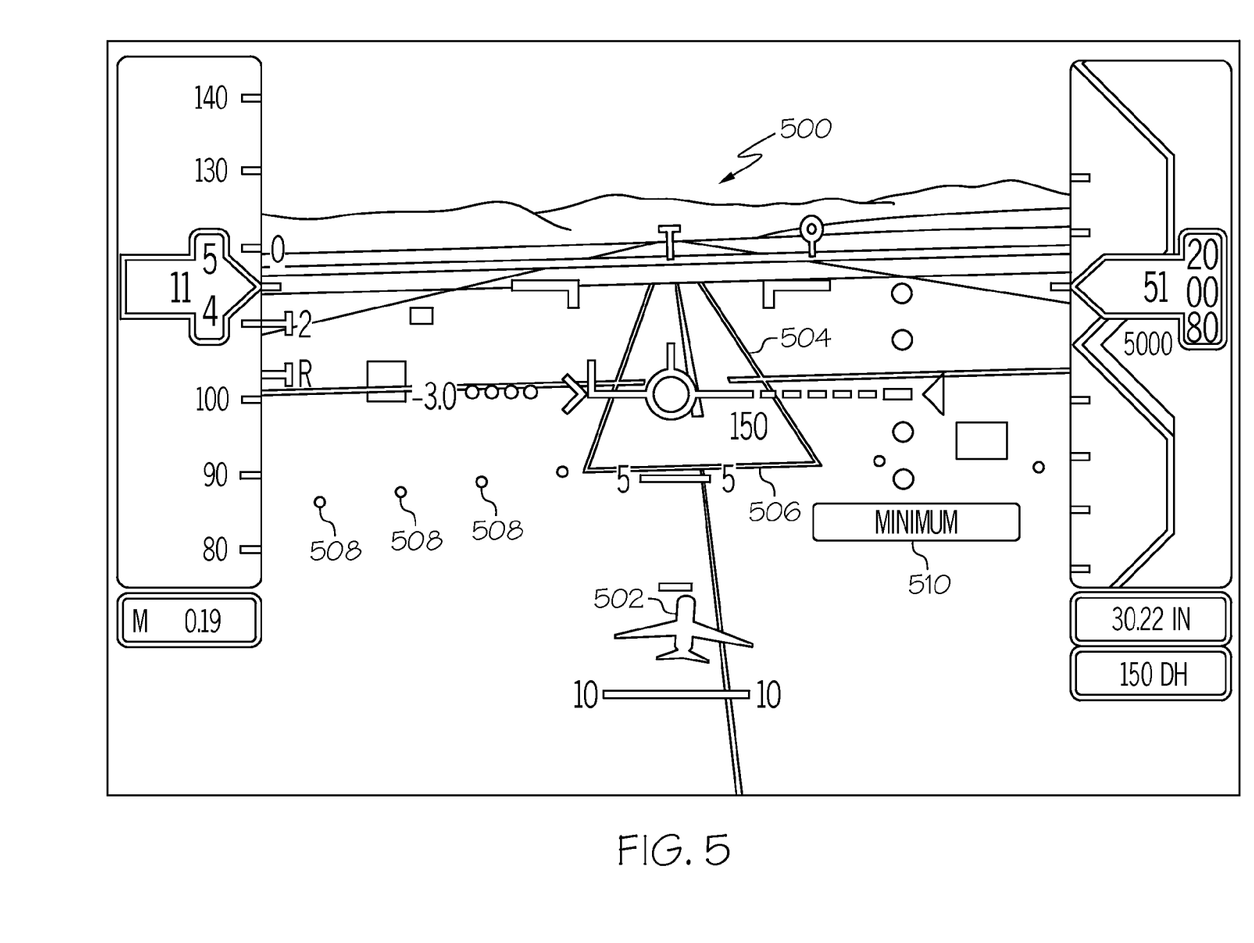
FIG. 5 illustrates a synthetic vision system (SVS) display showing runway and flight symbology and a VIM minimum range ring for determining when MAP awareness messages should be shown and annunciated.

The minimums annunciation is a common feature on primary flight displays (PFD). The minimums annunciation may comprise aural alerts and/or visual alerts displayed on a SVS display 500 as shown in FIG. 5, which shows an aircraft 502, a runway 504 having a threshold 506, and a minimums range ring 508 (similar to range ring 320 in FIG. 4). Alternatively, the minimums range ring may be displayed on a Multi-Function Display (MFD) or a moving map navigation display.

Figure 6:
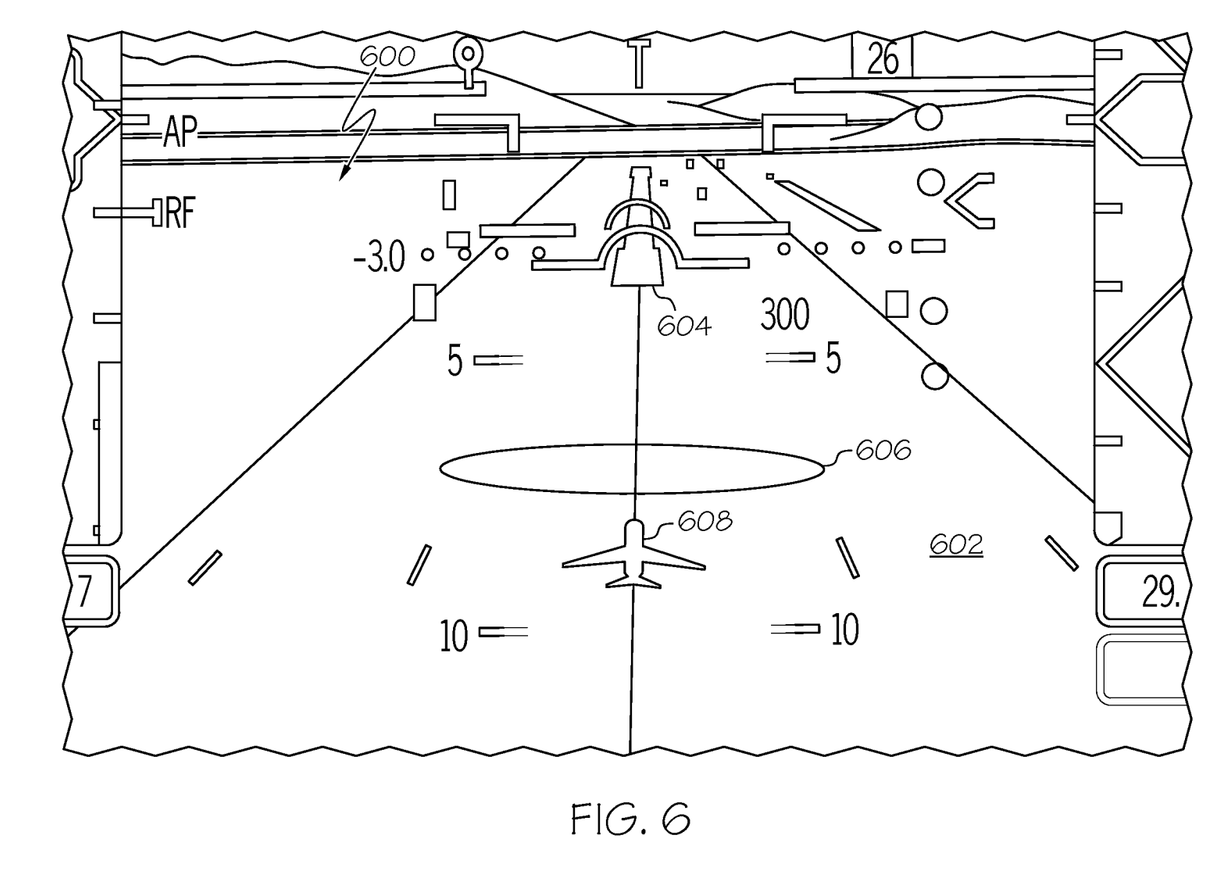
FIG. 6 illustrates a synthetic vision system (SVS) display showing runway and flight symbology and a VIM ellipse for determining when MAP awareness messages should be shown and annunciated.

As referred to previously, the location of the VIM can be represented by a graphic symbol on the ground on the final approach course 602 as shown in FIG. 6. The symbol is placed a distance from the runway threshold 604 equivalent to the VIM distance. For example, in FIG. 6 an oval or ellipse 606 indicates the location of the VIM. As aircraft 608 moves forward in the perspective view 600 and approaches the VIM (and the MAP), oval 606 grows in size and moves down the display providing a sense of closure and anticipation. Other symbols may be employed such as a three dimensional object, a tethered balloon, a 3D waypoint, and the like.

The minimum altitude is "bugged" (typically on the barometric altimeter) and displayed. Referring to the altimeter, a pilot is able to anticipate reaching the decision altitude as the aircraft descends toward the bugged value. When the aircraft reaches the decision altitude or the MAP, whichever occurs first, the minimums annunciation is activated. Additional anticipation may be provided by, for example, a semi-transparent window 510 may be displayed on the PFD. As the aircraft approaches the decision altitude, the word "MINIMUMS" may be inserted into window 510 as shown in FIG. 5. The VIM function may utilize this same annunciation as the aircraft approaches the virtual inner marker.

The minimums annunciation may be subject to two independent constraints and may trigger when either becomes true. First, if the aircraft descends below the decision altitude based on the aircraft's barometric altimeter, the minimums annunciation will trigger. Second, as the aircraft proceeds along a final approach and arrives within the VIMDistance (FIG. 3) from runway 306, the VIM function will trigger the minimums annunciation.

To reduce unwanted minimums alerting, as for example during a go-around when the aircraft may be well above the minima altitude as it passes over the MAP, the VIM function may only be active when (1) the aircraft is on final approach, and (2) within 150 feet of the decision altitude (i.e. twice the worst case barometric altimeter error), and (3) within 400 feet of the runway threshold (i.e. twice the Threshold to Virtual-Inner Marker distance to the runway threshold for a decision altitude of 150 feet); and (4) within a lateral displacement of 400 feet from the runway centerline (e.g. two times the lateral distance of two DOTs at 400 feet from the runway threshold.

Figure 7:
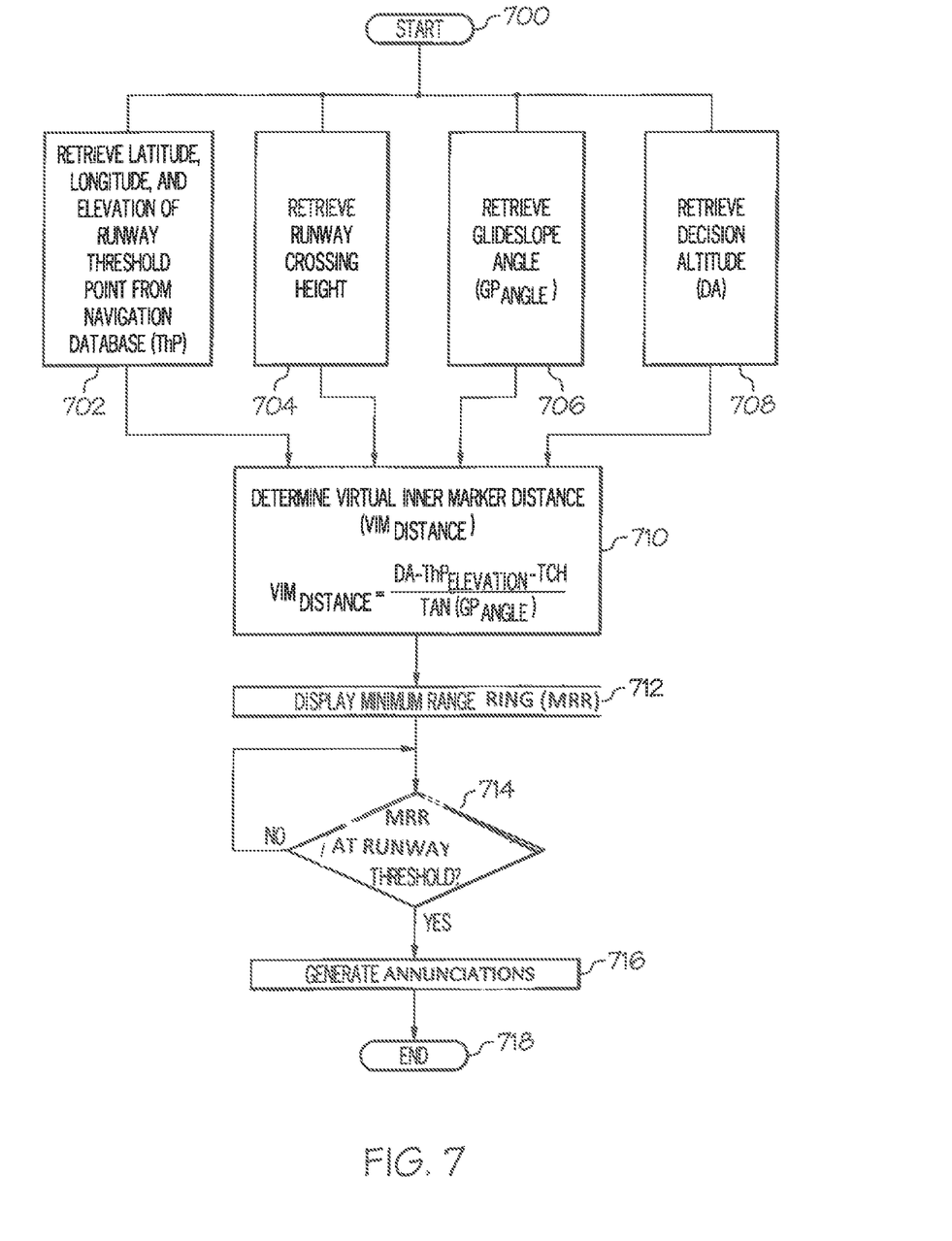
FIG. 7 is a flow chart of a method for displaying and announcing when an aircraft reaches the missed approach point (MAP).

FIG. 7 is a flow chart of a method 700 for displaying and announcing when an aircraft reaches a missed approach point (MAP) on an instrument approach having a geometric glide path. First, a processor retrieves the latitude, longitude, and elevation of the runway threshold (ThP) from a navigation database (STEP 702); the runway crossing height (TCH) from the navigation database (STEP 704); the glideslope angle (GPAngle) of the aircraft approach path (from an onboard database) (STEP 706); and the decision altitude (DA) (input by the pilot) (STEP 708). In STEP 710, a processor (e.g. 112 in FIG. 1) determines the distance to a virtual inner marker (VIM$_{Distance}$) in accordance with the expression:

$$VIM_{Distance} = \frac{DA - ThP_{Elevation} - TCH}{\text{Tan}(GP_{Angle})}$$

as previously described.

Next, symbology (e.g. a minimum range ring, ellipse, etc.) is displayed (STEP 712), and when the symbology, such as the minimum range ring (MRR) detects or arrives at the runway threshold (STEP 714) annunciations are generated (STEP 716) indicating to the crew that the MAP has been reached, and the process ends (STEP 718).

Thus, it should be appreciated that there has been provided a system and method for graphically displaying symbology representative of a virtual inner marker. Furthermore, aural and graphical annunciations are generated to indicate that the MAP has been reached. While an exemplary embodiment of the present invention has been described above in the context of a fully functioning computer system (i.e., avionics display system 100), those skilled in the art will recognize that the mechanisms of the present invention are capable of being distributed as a program product (i.e., an avionics display program) and, furthermore, that the teachings of the present invention apply to the program product regardless of the particular type of computer-readable media (e.g., floppy disc, hard drive, memory card, optical disc, etc.) employed to carry-out its distribution.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for anticipating a missed approach point (MAP) during an instrument landing of an aircraft, the method comprising:
   receiving a pilot selected barometric altitude minima referred to as a decision altitude (DA);
   determining, in a processor, when all of the following are true,
   (1) the aircraft is on a final approach,
   (2) the aircraft is within 150 feet of the DA,
   (3) the aircraft is within 400 feet of the runway threshold, and
   (4) the aircraft is within a lateral displacement of 400 feet from the runway centerline,
   a lateral distance from a runway threshold to a virtual inner marker, in accordance with the expression:

$$VIM_{Distance} = \frac{DA - ThP_{Elevation} - TCH}{\text{Tan}(GP_{Angle})}$$

where: $VIM_{Distance}$ is the lateral distance from the runway threshold to the virtual inner marker, DA is the decision altitude, ThP is an elevation of the runway threshold, TCH is a runway threshold crossing height, and $GP_{Angle}$ is a glide path angle;

determining (i) when the aircraft descends below the DA based on an aircraft barometric altimeter, and (ii) when the aircraft arrives within the $VIM_{Distance}$;

generating a minimums alert when either (i) the aircraft descends below the DA based on an aircraft barometric altimeter, or (ii) the aircraft arrives within the $VIM_{Distance}$;

displaying symbology graphically representative of the $VIM_{Distance}$; and modifying the $VIM_{Distance}$ symbology as a position of the aircraft approaches the $VIM_{Distance}$.

2. The method of claim 1 wherein the step of displaying comprises displaying a range marker.

3. The method of claim 2 wherein the range marker is part of a range ring.

4. The method of claim 2 further comprising displaying symbology graphically representative of a minimums range ring comprised of range markers on the display.

5. The method of claim 4 further comprising displaying indicia within the minimums window graphically representative of the aircraft at the MAP.

6. The method of claim 2 further comprising generating an aural annunciation indicating that the aircraft has reached the MAP.

7. The method of claim 1, wherein the step of displaying comprises displaying a perspective symbol.

8. The method of claim 7 wherein the perspective symbol is an ellipse.

9. The method of claim 1 wherein the virtual inner marker is a point on the aircraft's landing approach where the geometric glide path intersects the decision altitude and wherein a missed approach must be initiated if visual references have not been established.

10. A flight display system deployed on a host aircraft, for anticipating a missed approach point (MAP) during an instrument landing on an airport runway, the system comprising:

an onboard display device;

a navigation database comprising barometric altitude minima referred to as a decision altitudes (DAs);

a user interface coupled to the navigation database for receiving a pilot selected DA; and a processor operatively coupled to the navigation database and the display device and configured to (1) retrieve aircraft flight data, (2) retrieve airport data, (3) receive the pilot selected decision altitude (DA), (4) process only DA, ThP, TCH, and $GP_{Angle}$, to determine, when all of the following are true, (i) the aircraft is on a final approach, (ii) the aircraft is within 150 feet of the DA, (iii) the aircraft is within 400 feet of the runway threshold, and (iv) the aircraft is within a lateral displacement of 400 feet from the runway centerline, a lateral distance between a virtual inner marker and the runway threshold in accordance with the expression:

$$VIM_{Distance} = \frac{DA - ThP_{Elevation} - TCH}{\text{Tan}(GP_{Angle})}$$

where: $VIM_{Distance}$ is the lateral distance from the runway threshold to the virtual inner marker, DA is the decision altitude, ThP is the elevation of the runway threshold, TCH is the runway threshold crossing height, and $GP_{Angle}$ is the glide path angle, (5) determine (i) when the aircraft descends below the DA based on an aircraft barometric altimeter, and (ii) when the aircraft arrives within the $VIM_{Distance}$;

(6) generate a minimums alert when either (i) the aircraft descends below the DA based on an aircraft barometric altimeter, or (ii) the aircraft arrives within the $VIM_{Distance}$;

(7) display symbology graphically representative of the $VIM_{Distance}$; and (8) modify the symbology as a position of the aircraft approaches the $VIM_{Distance}$.

11. The system of claim 10, wherein the processor is further configured to display symbology graphically representative of a range marker.

12. The system of claim 11, wherein the range marker is a range ring.

13. The system according to claim 10, wherein the processor is further configured to generate indicia graphically representative of a minima window on the display.

14. The system of claim 13, wherein the processor is further configured to generate indicia within the minima window that graphically represents the arrival of the aircraft at the MAP.

15. The system of claim 14, wherein the processor is further configured to initiate an aural annunciation indicating that the aircraft has arrived at the MAP.

* * * * *